United States Patent [19]

Mori et al.

[11] Patent Number: 4,684,959

[45] Date of Patent: Aug. 4, 1987

[54] THERMAL RECORDING SYSTEM USING UNREGULATED POWER SUPPLY

[75] Inventors: Masaaki Mori, Kawasaki; Chiharu Okada, Tokyo, both of Japan

[73] Assignee: Ricoh Company, Ltd., Tokyo, Japan

[21] Appl. No.: 745,908

[22] Filed: Jun. 18, 1985

[30] Foreign Application Priority Data

Jun. 20, 1984 [JP] Japan ............................... 59-127226

[51] Int. Cl.$^{4}$ ............................................ G01D 15/10

[52] U.S. Cl. ............................... 346/76 PH; 400/120

[58] Field of Search ........................ 346/76 PH, 76 R; 219/216 PH, 488, 497; 400/120; 250/318

[56] References Cited

U.S. PATENT DOCUMENTS 4,168,421 9/1979 Ito ................................ 346/76 PH 4,219,824 8/1980 Asai ............................... 346/76 PH 4,409,600 10/1983 Minowa ........................ 346/76 PH

*Primary Examiner*—Arthur G. Evans

*Attorney, Agent, or Firm*—Cooper, Dunham, Griffin & Moran

[57] ABSTRACT

A thermal recording system includes a thermal print head provided with a plurality of electrical resistors arranged in the form of a single row and selectively activated when an activation pulse is supplied, a brute supply for supplying a power supply voltage to the resistors and a pulse generator for controlling the duration of the activation pulse in accordance with the level of the power supply voltage actually applied to the resistors. The pulse generator controls the pulse width of the activation pulse so as to maintain substantially constant the activation energy defined as a product of (power supply voltage actually applied)$^2$ and (pulse width of activation pulse).

7 Claims, 8 Drawing Figures

FIG. 1
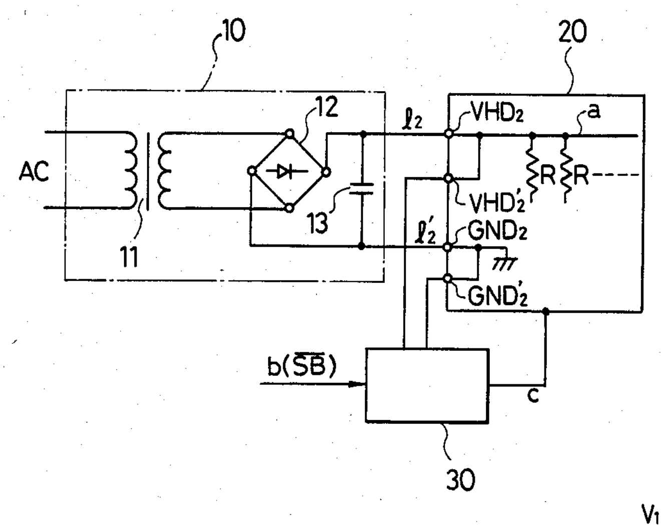
FIG. 2 a
FIG. 2 b
FIG. 2 c
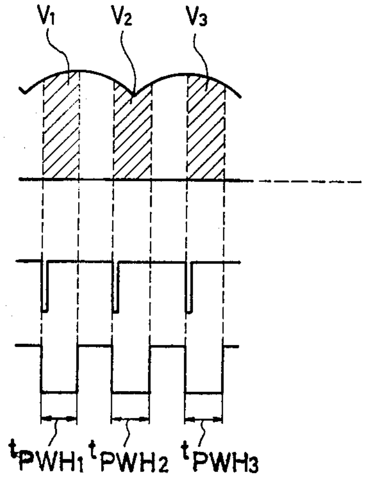
FIG. 3
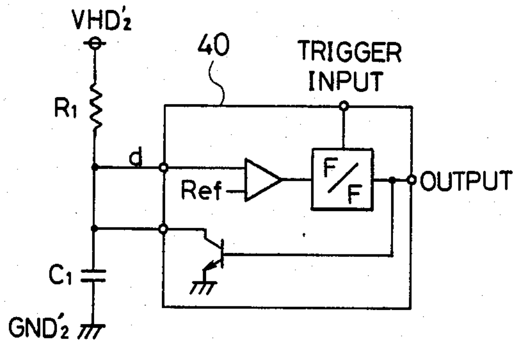

THERMAL RECORDING SYSTEM USING UNREGULATED POWER SUPPLY

BACKGROUND OF THE INVENTION

1. Field of the Invention

This invention relates to a thermal recording system for recording information on a recording medium by a thermal printhead which includes a plurality of heat-producing elements arranged in the form of an array, and in particular, to such a thermal recording system using a unregulated supply as a power source.

2. Description of the Prior Art

A thermal recording system is well known in the art and its typical structure is illustrated in FIG. 7. As shown, the thermal recording system includes a power supply 10 connected to an a.c. commercial line and a thermal print head 20 which includes a plurality of electrically resistive elements R which are arranged in the form of a single row. As will be described later in detail, the plurality of resistors R are selectively activated in accordance with image information supplied thereto to produce heat to "burn" points on a recording medium which is moved in contact with the array of resistors R in the direction perpendicular to the longitudinal direction of the row, as well known in the art.

As shown in FIG. 7, the thermal print head 20 is also provided with a shift register SR having the capacity to store bits of information corresponding to the number of resistors R. The shift register SR receives image information DI through its serial input terminal serially. Also provided is a latch L which has the same capacity as that of the shift register SR, whereby each bit of the latch L is connected to the corresponding one of the bits of the shift register SR. Thus, when the latch L receives a load signal LD, the image information then stored in the shift register SR is transferred into the latch L in parallel. Also provided are a plurality of AND gates G each of which has its one input connected to the corresponding one bit of the latch L and having the other input connected to receive a strobe signal $\overline{SB}$. Each AND gate G has its output connected to the base of a corresponding switching transistor Tr which has its collector connected to one end of the corresponding resistor R. Each of the transistors Tr has its emitter connected to ground, and the other end of each of the resistors R is connected to a common line 1″, to which a desired driving voltage is applied from the power supply 10, as will be described more in detail later.

In such a line-type thermal print head, there are provided a large number of resistors R, typically, in the order of 1,000 to 2,000, so that, for example, in the case of a thermal print head having the resolution of 8 dots per mm and the recording width of 200 mm, its power supply is required to supply several hundreds W of power if it is desired to activate all of the resistors R at the same time for recording all black across the width of the line array. In order to mitigate the power requirement, the resistors R may be activated as divided and staggered in time; in this case, however, it is often required that a power supply be of the capacity in the order of 100 W. If the power supply 10 is assumed to have the capacity of 10 V, there will be a flow of current in the order of 10 A between terminals $VHD_1$ and $GND_1$, and, thus, if either of lines 1 and 1′ does not have a sufficient current capacity, there will be created an appreciable voltage drop. The same arguments hold true for the common line 1″ inside of the thermal print head 20. Such a voltage drop will cause the recording density to deteriorate so that locally high and low density areas will be created. On the other hand, to provide a power supply having the capacity of supplying 100 W or more is not advantageous from an economical viewpoint.

As disclosed in the Japanese Patent Laid-open Pub. No. 52-19542, in the case of a battery-powered thermal printer, there has been proposed a method for maintaining the recording density constant by controlling the activation time period based on monitoring the applied voltage. In this voltage-controlled thermal printer, the activation time period is controlled in accordance with the power supply voltage to be applied to the electrical resistors to keep the level of energy applied to the resistors constant and thereby provide stable recording density. In the case of the device disclosed in the above-referenced Japanese application, it is battery-powered and of the serial printing type, wherein the number of dots to be printed at the same time is extremely small. However, in the case of a thermal print head for use in a line printer, which has attracted much attention lately and is coming into wide use, it is required to operate at high speed with large current, so that any voltage drop in the interconnection between the power supply and the thermal print head can not be neglected, thereby making it difficult to maintain stable recording density.

SUMMARY OF THE INVENTION

In order to attain the objective of the present invention, there is provided a thermal recording system using a power supply which includes a transformer having its primary side connected to an a.c. power line, such as a commercial a.c. line, a rectifying diode connected across the secondary side of the transformer and a capacitor connected in parallel with the diode. With such a structure, the pulse width of an activation pulse to be applied to one of the resistors of a thermal print head is controlled to maintain the product of (detected voltage)$^2$×(pulse width of applied pulse) substantially constant while monitoring and detecting the voltage to be supplied to the resistors for recording.

It is therefore a primary object of the present invention to obviate the disadvantages of the prior art as described above and to provide an improved thermal recording system.

Another object of the present invention is to provide a thermal recording system using a unregulated power supply instead of a stabilized power supply including a battery.

A further object of the present invention is to provide a thermal recording system having a power supply compact in size, low in cost, and yet stable in operation.

Other objects, advantages and novel features of the present invention will become apparent from the following detailed description of the invention when considered in conjunction with the accompanying drawings.

BRIEF DESCRIPTION OF THE DRAWINGS

FIG. 1 is a circuit diagram showing a thermal recording system using a unregulated power supply constructed in accordance with one embodiment of the present invention;

Figure 4:
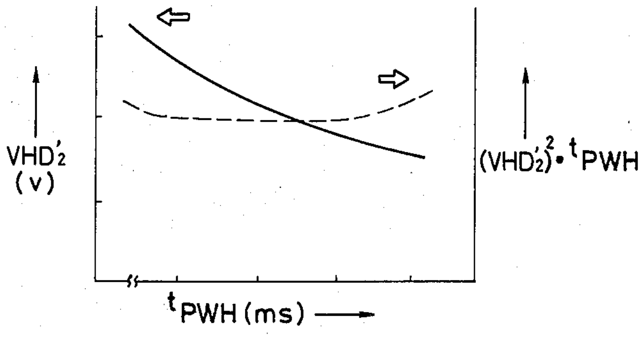
Figure 5:
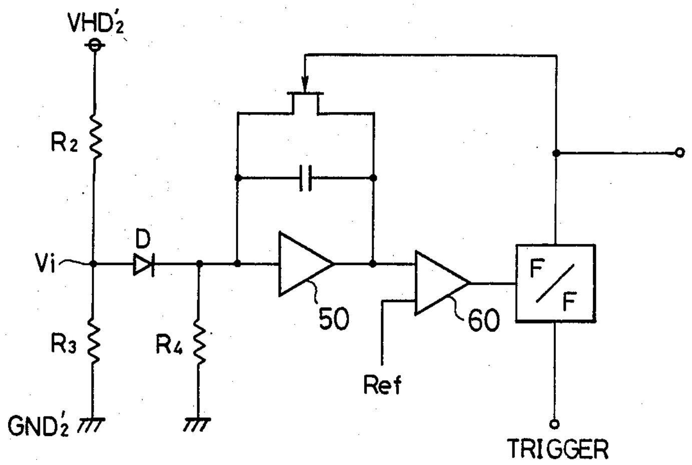
Figure 6:
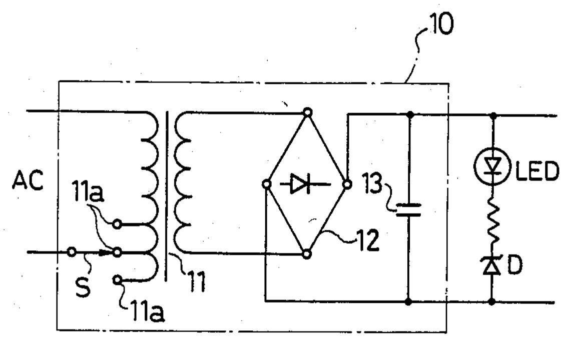
Figure 7:
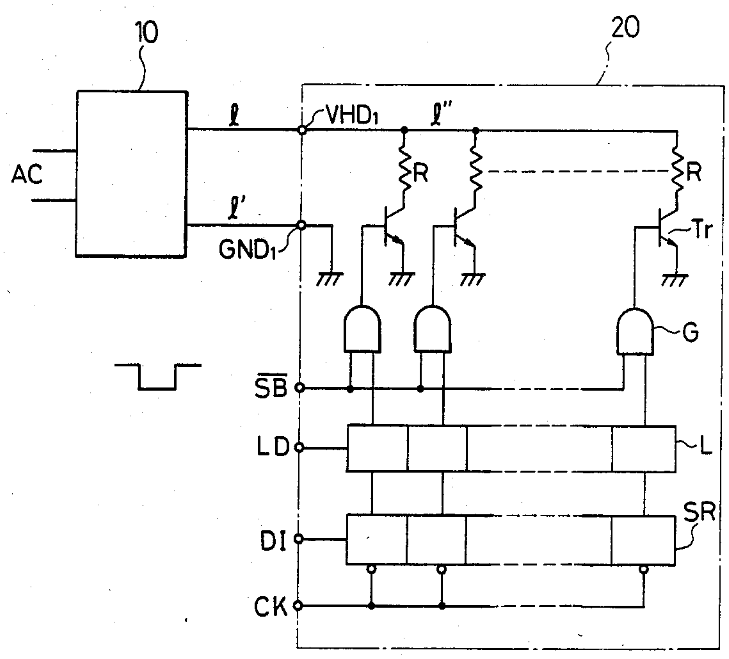

FIGS. *2a–2c* are waveform diagrams showing the waveforms at various points a–c indicated in FIG. 1;

FIG. 3 is a circuit diagram showing the detailed structure of the pulse generator 30 provided in the system shown in FIG. 1;

FIG. 4 is a graph useful for explaining the principle of the present invention;

FIGS. 5 and 6 are circuit diagrams showing alternative structures of the pulse generator 30 provided in the system shown in FIG. 1; and FIG. 7 is a schematic illustration showing a typical thermal recording system.

DESCRIPTION OF THE PREFERRED EMBODIMENTS

FIG. 1 shows a thermal recording system using a unregulated power supply, embodying the present invention. The illustrated system includes a power supply 10 connected to an a.c. power line, such as a commercial a.c. line, a thermal print head 20 connected to the power source 10 to receive therefrom a desired power voltage, and a pulse generator 30 which is operatively connected to the thermal print head 20. In the illustrated embodiment, the power supply 10 includes a transformer 11, a rectifying diode 12 and a capacitor 13. The transformer 11 has its primary side connected to the a.c. power line and its secondary side connected to a pair of input terminals of the rectifier 12 which has a pair of output terminals across which the capacitor 13 is connected. Thus, the voltage of the a.c. power line is first regulated by the transformer 11 to a desired voltage level suitable for use in the thermal print head 20, and the thus regulated voltage is subjected to a full-wave rectification at the rectifier 12. Then, the rectified voltage is smoothed by the capacitor 13.

Also provided is a pair of interconnection lines $\mathbf{l_2}$ and $\mathbf{l_2}'$ between the power supply 10 and the thermal print head 20. The interconnection line $\mathbf{l_2}$ has one end connected to one end of the capacitor 13 of the power supply 10 and other end connected to a first terminal $VHD_2$, which, in turn, is connected to a common line a which is commonly connected to one end of each of the resistors R provided in the print head 20. The other interconnection line $\mathbf{l_2}'$ has one end connected to the other end of the capacitor 13 and other end connected to a second terminal $GND_2$ of the print head 20, which is connected to ground. It is to be noted that the thermal print head 20 is also provided with another pair of third and fourth terminals $VHD_2'$ and $GND_2'$, which are connected to the interconnection lines $\mathbf{l_2}$ and $\mathbf{l_2}'$ inside of the print head 20, respectively, and also to the pulse generator 30. Since the third terminal $VHD_2'$ is connected to the common connection line a inside of the thermal print head 20 and the fourth terminal $GND_2'$ is connected to the ground potential inside of the thermal print head 20, the actual activation voltage applied to the resistors R can be monitored. It is to be noted that additional terminals $VHD_2$ and $GND_2$ may be provided, if desired.

Since the third and fourth terminals $VHD_2'$ and $GND_2'$ are connected to the pulse generator 30, the voltage present in the common connection line a is applied to the pulse generator 30, which thus produces an activation pulse c, having a pulse width which varies in accordance with a trigger signal b($\overline{SB}$), to be applied to the resistors R. In thermal recording technique, however, since the recording takes place due to thermal effects, the recording density depends on the level of applied energy. Stated in greater detail, denoting the voltage applied to the resistors R by V, the resistive value of the resistors R by $R_0$ and the activation time period by $t_{PWH}$, then the applied energy E for recording may be expressed as follows:

$$E = V^2/R_0 \cdot t_{PWH}.$$

As long as E remains unchanged, the same or approximately same recording density can be obtained. Therefore, even if the applied voltage V fluctuates, the recording density can be maintained virtually at constant as long as the product of $V^2 \cdot t_{PWH}$ or applied energy for recording is maintained at constant.

The waveforms shown in FIGS. 2a through 2c indicate the waveforms of voltages at points a through c indicated in the system of FIG. 1, respectively. As indicated in FIGS. 2a through 2c, the pulse generator 30 controls the width of the pulse on line c such that a product between the average applied voltage squared and the pulse width in a predetermined time period remains unchanged, i.e., $$V_1^2 \cdot t_{PWH1} = V_2^2 \cdot t_{PWH2} = V_3^2 \cdot t_{PWH3}.$$

FIG. 3 shows in circuit diagram form the detailed structure of one embodiment of the pulse generator 30. In this embodiment, use is made of a well-known monostable-multivibrator 40 which has a threshold voltage input terminal d which, in turn, is connected to an interconnection between a resistor $R_1$ and a capacitor $C_1$. As shown, the resistor $R_1$ is connected to the third terminal $VHD_2'$ at one end, and the capacitor $C_1$ is connected to the fourth terminal $GND_2'$ at one end. With the structure shown in FIG. 3, by selecting suitable parameters for the resistor $R_1$ and capacitor $C_1$, the product of $(VHD_2')^2 \cdot t_{PWH}$ has been found to remain virtually unchanged, i.e., $\pm 5\%$ fluctuation range, over a range of 0.8 to 2.5 milliseconds, even if the applied voltage $VHD_2'$ has varied, as illustrated in the graph of FIG. 4. In the graph of FIG. 4, the abscissa indicates the pulse width $t_{PWH}$ of an activation pulse to be applied to the resistors R in terms of milliseconds; whereas, the left ordinate indicates the applied voltage $VHD_2'$ actually applied to the resistors R and the right ordinate indicates the energy applied to the resistors R and defined by the product of applied voltage squared and the pulse width.

FIG. 5 shows another embodiment of the pulse generator 30 provided in the system of FIG. 1. This pulse generator includes a voltage divider comprised of a pair of resistors $R_2$ and $R_3$ which are connected in series between the third and fourth terminals, $VHD_2'$ and $GND_2'$. Also provided is a diode D whose anode is connected to the interconnection between the resistors $R_2$ and $R_3$ and whose cathode is connected to ground through a resistor $R_4$ and also to an input of an integrator 50, which, in turn, has its output connected to one input of a comparator 60 having its the other input connected from a reference voltage Ref and its output connected to a flip-flop F/F. There are also provided other elements, such as MOS transistor and a capacitor, connected as shown. With this structure, the voltage between the third and fourth terminals, $VHD_2'$ and $GND_2'$, is divided by a ratio of resistances of resistors $R_2$ and $R_3$ such that the thus divided voltage $V_i$ is 2 V or less. Then, utilizing the quadratic characteristic of diode D, the voltage $V_i$ is subjected to quadratic conversion, and the resulting voltage is detected by the resistor $R_4$ and integrated by the integrator 50. Then, the integrated voltage is supplied to the comparator 60 so as to realize the condition of $V^2 \cdot t_{PWH}$=constant. It has been found that the circuit of FIG. 5 is also capable of limiting the fluctuations within ±5%.

It has been confirmed that either one of the above-described pulse generators is capable of operating at the speed of a few milliseconds. In a thermal recording system of the type described, use is normally made of a pulse or stepping motor or a DC motor for advancement of recording paper. In such a case, it is advantageous to stagger the operation of the motor and the printhead such that paper feed is carried out during a non-printing time period, thereby allowing for more effective use of the power supply and improved paper feed with less ripple in driving torque.

If the voltage applied to the resistors R of the thermal print head 20 becomes excessive, the resistors R tend to be used always at elevated temperature, which is disadvantageous because it tends to deteriorate the resistors R soon. In order to avoid this, it is preferable to use the resistors R in an optimal temperature range. FIG. 6 illustrates an embodiment of a power supply 10 which can overcome such a problem. As shown in FIG. 6, a Zener diode D and a light-emitting diode LED are provided as connected in series in parallel with the capacitor 13. In addition, a switch S having three contact points 11*a* is provided as connected in the primary winding of the transformer 11. With this structure, the voltage across the capacitor 13 can be monitored and the light-emitting diode LED will be lit if the voltage across the capacitor 13 exceeds a predetermined limit determined by the threshold level of the Zener diode D. If this happens, since the power source voltage to be applied to the resistors R of the print head 20 will become excessive, the switch S may be operated to change the contact points 11*a* such that the voltage across the capacitor 13 becomes lowered suitably. It is to be noted, as will be clear to one skilled in the art, that there may be preferably provided an appropriate coupling mechanism between the switch S and the light-emitting diode LED such that the operation of the switch as described above can take place automatically.

As described in detail above, in accordance with the present invention, the overall cost of a thermal recording system can be lowered because of the use of a unregulated power supply as its power supply. Besides, since the pulse width of the activation pulse is controlled while monitoring the voltage to be applied to the resistors of a thermal print head, the recording density can be maintained at constant even if the number of black dots to be recorded per line changes. Even if there is a voltage drop in an interconnection line inside and outside of a thermal print head due to large current in the case of a high-speed recording mode, the reduction of recording density, if any, can be minimized.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A thermal recording system comprising:

a thermal print head including a plurality of heat-producing elements arranged in the form of an array, said plurality of heat-producing elements being selectively activated in accordance with an activation pulse supplied thereto, said thermal print heat including a common connection line to which one end of each of said plurality of heat-producing elements is commonly connected, a first detection terminal connected to said common connection line, and a second detection terminal connected to a reference potential;

a power supply connected to said thermal print head so as to apply a power supply voltage to at least one of said plurality of heat-producing elements for activation thereof; and control means connected to said thermal print head for controlling the duration of said activation pulse so as to keep the activation energy applied to said plurality of heat-producing elements substantially constant while monitoring the voltage across said plurality of heat-producing elements, wherein said control means is connected to said first and second detection terminals to detect a voltage which is substantially equal to the voltage actually applied across said plurality of heat-producing elements, said controlling means including a pair of first and second resistors which are connected in series between said first and second detection terminals, a diode having an anode connected to the interconnection between said first and second resistors and a cathode which is connected to ground through a third resistor, integrating means having an integrator input terminal connected to said cathode and an integrator output terminal, a comparator having a first input terminal connected to said integrator output, a second input terminal connected to a reference voltage and an output terminal, and a flip-flop having a first input terminal connected to said output terminal of said comparator, a second input terminal for receiving said activation pulse and an output terminal for supplying said pulse width-controlled activation pulse.

2. The system of claim 1 wherein each of said plurality of heat-producing elements includes an electrical resistor which produces heat when an electric current pulse is passed therethrough.

3. The system of claim 2 wherein said control means controls the duration of said activation pulse such that the product of (power supply voltage actually applied)$^2$ and (pulse width of said activation pulse) is maintained substantially constant.

4. The system of claim 3 wherein said power supply includes a transformer having a primary winding connected to an a.c. power source and a secondary winding, a rectifier having a first pair of input terminals to which said secondary winding is connected and a second pair of output terminals, and a first capacitor connected between said second pair of output terminals, wherein a voltage across said capacitor defines said power supply voltage.

5. The system of claim 4 further comprising monitoring means connected in parallel with said first capacitor for monitoring the voltage across said first capacitor, wherein said power supply further includes adjusting means provided connected in said primary winding of said transformer to allow for varying the active length of said primary winding.

6. The system of claim 5 wherein said monitoring means includes a series connection of a light-emitting diode and a Zener diode connected in parallel with said first capacitor.

7. The system of claim 5 wherein said adjusting means includes a switch having a plurality of contact points provided at different locations of said primary winding.

* * * * *